US012597345B2

(12) United States Patent
Yoshizaki

(10) Patent No.: US 12,597,345 B2
(45) Date of Patent: Apr. 7, 2026

(54) METHODS, SYSTEMS, AND DEVICES FOR E-MIRROR TRAFFIC LANE IDENTIFICATION

(71) Applicant: Toyota Motor Engineering & Manufacturing North America, Inc., Plano, TX (US)

(72) Inventor: Coh L. Yoshizaki, Wixom, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 55 days.

(21) Appl. No.: 18/668,029

(22) Filed: May 17, 2024

(65) Prior Publication Data

US 2025/0356756 A1 Nov. 20, 2025

(51) Int. Cl.
*G08G 1/0962* (2006.01)
*G01C 21/36* (2006.01)
*G08G 1/01* (2006.01)

(52) U.S. Cl.
CPC ..... *G08G 1/09626* (2013.01); *G01C 21/3658* (2013.01); *G08G 1/0112* (2013.01); *G08G 1/0125* (2013.01)

(58) Field of Classification Search
CPC ............. G08G 1/09626; G08G 1/0112; G08G 1/0125; G01C 21/3658
See application file for complete search history.

(56) References Cited

U.S. PATENT DOCUMENTS

| | | | |
|---|---|---|---|
| 8,559,675 B2 | 10/2013 | Nogami et al. |
| 8,704,653 B2 | 4/2014 | Seder et al. |
| 9,852,635 B2 | 12/2017 | Fukuda et al. |
| 10,464,490 B2 | 11/2019 | Katsuyama et al. |
| 10,540,756 B2 | 1/2020 | Junglas et al. |
| 10,857,941 B2 | 12/2020 | Yoshizaki et al. |
| 11,161,456 B1 | 11/2021 | Day et al. |

(Continued)

FOREIGN PATENT DOCUMENTS

| | | |
|---|---|---|
| EP | 3745714 A1 | 12/2020 |
| JP | 07120380 B2 | 12/1995 |

(Continued)

OTHER PUBLICATIONS

European Patent Office, European Extended Search Report, corresponding EP Application No. 25176775.2, mailing date Sep. 2, 2025, 8 pages.

*Primary Examiner* — Scott A Browne
*Assistant Examiner* — Shahira Baajour
(74) *Attorney, Agent, or Firm* — Snell & Wilmer LLP

(57) ABSTRACT

Methods, systems, and devices for assisting a driver of a vehicle. A traffic lane identification system may include one or more displays located on or within the vehicle. The system may further include an electronic control unit (ECU) coupled to the one or more displays. The ECU may transmit a real-time video data to a display so as to display the field of view of the surrounding area of the vehicle. The ECU may further generate a lane identifier indicating a current traffic lane of the vehicle. The ECU may further transmit the lane identifier to the display so as to display the lane identifier overlaid within the field of view of the surrounding area of the vehicle.

16 Claims, 9 Drawing Sheets

(56) References Cited

U.S. PATENT DOCUMENTS

| | | | |
|---|---|---|---|
| 11,450,040 | B2 | 9/2022 | Fukuda |
| 11,524,630 | B2 | 12/2022 | Iida et al. |
| 11,539,894 | B2 | 12/2022 | Nakayama |
| 2009/0080704 | A1* | 3/2009 | Mori ...................... G08G 1/167 |
| | | | 382/104 |
| 2015/0251602 | A1* | 9/2015 | Baur ................. G08G 1/09626 |
| | | | 348/148 |
| 2019/0130755 | A1* | 5/2019 | Lin ........................ G08G 1/164 |
| 2019/0389385 | A1 | 12/2019 | Diedrich et al. |
| 2020/0210717 | A1* | 7/2020 | Hou ..................... G06V 20/588 |
| 2021/0206318 | A1 | 7/2021 | Iida et al. |
| 2021/0370920 | A1 | 12/2021 | Sakaguchi et al. |
| 2023/0191911 | A1 | 6/2023 | Izumi et al. |

FOREIGN PATENT DOCUMENTS

| | | | |
|---|---|---|---|
| JP | 2020088406 | A | 6/2020 |
| WO | 2020072050 | A1 | 4/2020 |
| WO | 2022210171 | A1 | 10/2022 |

* cited by examiner

600

RECEIVE REAL-TIME VIDEO DATA FROM ONE
OR MORE CAMERAS OF A VEHICLE — 602

GENERATE A LANE IDENTIFIER INDICATING A CURRENT
TRAFFIC LANE OF THE VEHICLE — 604

TRANSMIT THE LANE IDENTIFIER TO A DISPLAY SO AS TO
DISPLAY THE LANE IDENTIFIER OVERLAID WITHIN A FIELD OF
VIEW VIA THE DISPLAY — 606

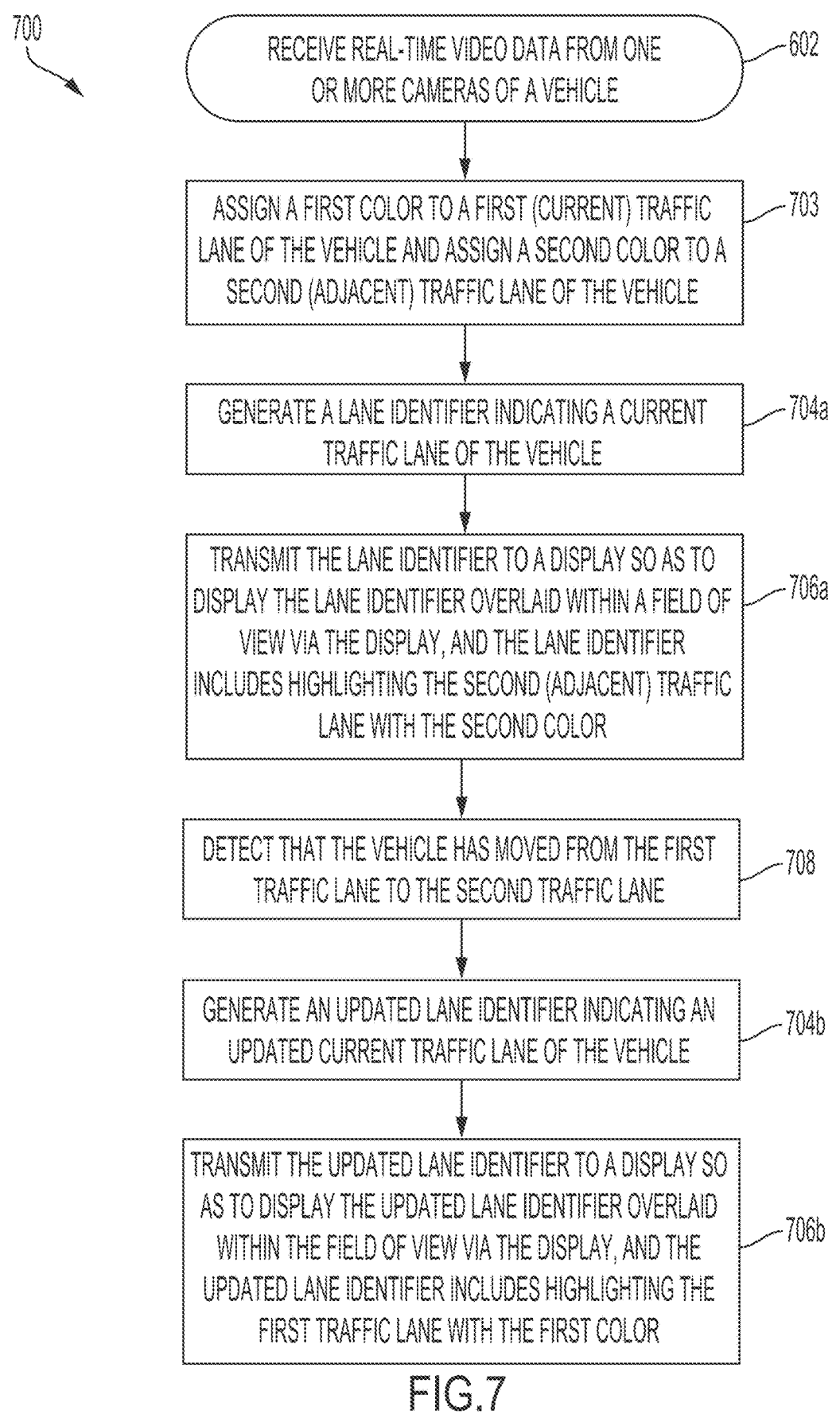

700

RECEIVE REAL-TIME VIDEO DATA FROM ONE
OR MORE CAMERAS OF A VEHICLE — 602

ASSIGN A FIRST COLOR TO A FIRST (CURRENT) TRAFFIC
LANE OF THE VEHICLE AND ASSIGN A SECOND COLOR TO A
SECOND (ADJACENT) TRAFFIC LANE OF THE VEHICLE — 703

GENERATE A LANE IDENTIFIER INDICATING A CURRENT
TRAFFIC LANE OF THE VEHICLE — 704a

TRANSMIT THE LANE IDENTIFIER TO A DISPLAY SO AS TO
DISPLAY THE LANE IDENTIFIER OVERLAID WITHIN A FIELD OF
VIEW VIA THE DISPLAY, AND THE LANE IDENTIFIER
INCLUDES HIGHLIGHTING THE SECOND (ADJACENT) TRAFFIC
LANE WITH THE SECOND COLOR — 706a

DETECT THAT THE VEHICLE HAS MOVED FROM THE FIRST
TRAFFIC LANE TO THE SECOND TRAFFIC LANE — 708

GENERATE AN UPDATED LANE IDENTIFIER INDICATING AN
UPDATED CURRENT TRAFFIC LANE OF THE VEHICLE — 704b

TRANSMIT THE UPDATED LANE IDENTIFIER TO A DISPLAY SO
AS TO DISPLAY THE UPDATED LANE IDENTIFIER OVERLAID
WITHIN THE FIELD OF VIEW VIA THE DISPLAY, AND THE
UPDATED LANE IDENTIFIER INCLUDES HIGHLIGHTING THE
FIRST TRAFFIC LANE WITH THE FIRST COLOR — 706b

FIG.7

METHODS, SYSTEMS, AND DEVICES FOR E-MIRROR TRAFFIC LANE IDENTIFICATION

BACKGROUND

1. Field

The present disclosure relates to methods, systems, and/or devices for e-mirror traffic lane identification.

2. Description of the Related Art

Modern vehicles are often equipped with numerous screens and cameras to aid a user (e.g., a driver and/or a passenger) of a vehicle with various vehicle maneuvers, such as changing lanes, parking, and/or reversing. The screen(s) may allow the driver to view live video captured by the camera(s) of a surrounding area of the vehicle. However, the driver may become confused or overwhelmed, particularly at a quick glance, when trying to judge which portion of the image is the vehicle's own lane or an adjacent lane. Inclement weather conditions (e.g., rain, snow, sleet, etc.) may also contribute to the difficult in judging or seeing lanes or lane markers. The risk of the driver not judging or seeing the lanes correctly is especially present when the vehicle is new to the driver, the driver is tired, lots of traffic is present, the driver/vehicle is switching lanes, the screen image does not contain vehicle body parts in the image, and/or the camera is not mounted exactly in the vehicle center.

Accordingly, it is desirable to provide methods, systems, and devices for e-mirror traffic lane identification.

SUMMARY

In general, one aspect of the subject matter described in this disclosure may be embodied in a traffic lane identification system for a vehicle. The traffic lane identification system may include one or more displays located on or within the vehicle. The traffic lane identification system may further include an electronic control unit (ECU) coupled to the one or more displays. The ECU may be configured to transmit a real-time video data to the display so as to display a field of view a surrounding area of the vehicle via the display. The ECU may be further configured to generate a lane identifier indicating a current traffic lane of the vehicle. The ECU may be further configured to transmit the lane identifier to the display so as to display the lane identifier overlaid within the field of view via the display.

In one aspect, the subject matter may be embodied in a traffic lane identification system for assisting a driver of a vehicle. The traffic lane identification system can include a camera configured to capture a real-time video data of a field of view of a surrounding area of the vehicle. The traffic lane identification system can further include a display located on or within the vehicle. The traffic lane identification system can further include an electronic control unit (ECU) coupled to the display and the camera. The ECU can be configured to transmit the real-time video data to the display so as to display the field of view of the surrounding area of the vehicle via the display. The ECU can be further configured to generate a lane identifier indicating a current traffic lane of the vehicle. The ECU can be further configured to transmit the lane identifier to the display so as to display the lane identifier overlaid within the field of view via the display.

In one aspect, the subject matter may be embodied in a method for assisting a driver of a vehicle. The method can include transmitting, via an electronic control unit (ECU) of the vehicle, a real-time video data to a display so as to display a field of view a surrounding area of the vehicle via the display. The method can further include generating, via the ECU, a lane identifier indicating a current traffic lane of the vehicle. The method can further include transmitting, via the ECU, the lane identifier to the display so as to display the lane identifier overlaid within the field of view via the display.

These and other embodiments may optionally include one or more of the following features.

In various aspects, the traffic lane identification system can further include a camera coupled to the ECU and configured to capture the real-time video data of the field of view of the surrounding area of the vehicle.

In various aspects, the field of view of the surrounding area of the vehicle includes a rearward field of view with respect to the vehicle.

In various aspects, the display includes a digital rearview mirror configured to display the rearward field of view and/or the lane identifier.

In various aspects, the lane identifier includes a marker highlighting a lane marking of the current traffic lane of the vehicle.

In various aspects, the lane identifier includes a first zone including the current traffic lane of the vehicle and a second zone.

In various aspects, at least one of a color or a brightness of the second zone is adjusted with respect to the first zone.

In various aspects, the lane identifier includes a plurality of colors, each color of the plurality of colors is assigned to a respective traffic lane of a plurality of traffic lanes identified in the field of view.

In various aspects, the ECU is further configured to determine that the vehicle is performing a lane change maneuver. In various aspects, the ECU is further configured to turn off the lane identifier from the display during the lane change maneuver. In various aspects, the ECU is further configured to determine that the vehicle has completed the lane change maneuver. In various aspects, the ECU is further configured to generate an updated lane identifier indicating a new current traffic lane of the vehicle. In various aspects, the ECU is further configured to transmit the updated lane identifier to the display so as to display the updated lane identifier overlaid within the field of view via the display.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

FIG. 7 is a flow diagram of an example process for controlling the lane identification system of FIG. 1, according to an aspect of the disclosure.

DETAILED DESCRIPTION

Disclosed herein are methods, systems, devices, and/or vehicles for implementing a traffic lane identification system. The traffic lane identification system may include one or more displays located within a cabin of a vehicle. Particular embodiments of the subject matter described in this disclosure may be implemented to realize one or more of the following advantages. The traffic lane identification system may generate a lane identifier indicating a current traffic lane of a user (e.g., a driver and/or a passenger) of the vehicle. The traffic lane identification system can allow the user to quickly and clearly identify and understand the vehicle's own traffic lane apart from adjacent traffic lanes. Moreover, the lane identifier can quickly direct the user's attention to the present traffic lane of the vehicle. The lane identifier may be a graphical icon or marker that is displayed by at least one display (e.g., a rearview mirror). By indicating the current traffic lane of the vehicle, the lane identifier may eliminate or at least reduce an amount of time that the user spends looking at the display to ascertain the current traffic lane of the vehicle, thereby improving safety and reducing user confusion or error.

Moreover, the traffic lane identification system may further improve safety by assigning traffic lane colors such that each traffic lane maintains its assigned color as the lane identifiers are automatically and dynamically updated as the vehicle changes lanes. For example, when the vehicle performs a lane change maneuver to move from a first traffic lane to a second traffic lane, the traffic lane identification system can update the lane identifier based on the new field of view from the second traffic lane. This updated lane identifier can maintain the previous traffic lane colors displayed from when the vehicle was in the first traffic lane, thereby reducing user confusion.

As used herein, "e-mirror" may refer to use of a camera or other image sensor to detect image data behind a vehicle and to display the image data on a display screen within the vehicle. The display screen may be integrated into an existing mirror (e.g., a rearview mirror or a side-view mirror) or be a separate mirror or screen. In this way, the camera and the display screen comprise an electronic mirror that behaves and functions similarly to a conventional mirror.

Figure 1:
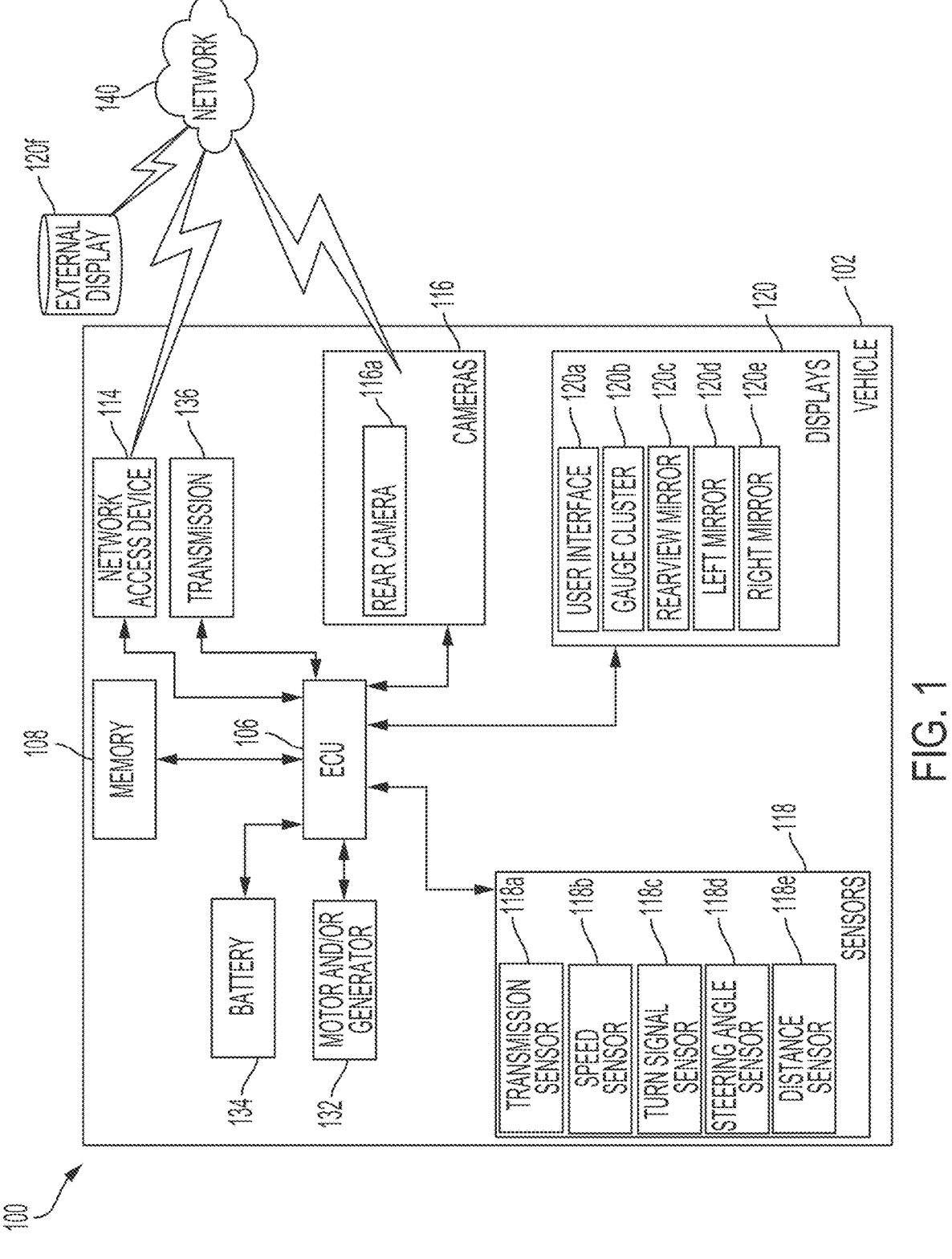
FIG. 1 is a block diagram of an example traffic lane identification system for a vehicle, according to an aspect of the disclosure.

FIG. 1 is a block diagram of an example traffic lane identification system 100. The traffic lane identification system 100 or a portion thereof may be retrofitted, coupled to, include, or be included within a vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The traffic lane identification system and/or the vehicle 102 may include a motor and/or generator 132, a battery 134, and/or a transmission 136. The motor and/or generator 132 may be located within an engine bay of the vehicle 102. The motor and/or generator 132 may be an internal combustion engine (ICE). In this regard, the motor and/or generator 132 may combust an air and fuel mixture to provide power to the vehicle 102 and/or components of the vehicle 102 and/or the traffic lane identification system 100. Accordingly, the motor and/or generator 132 can cause the vehicle 102 to accelerate, decelerate, or maintain a desired velocity. The motor and/or generator 132 may include combinations of an ICE and an electric motor, such as for hybrid vehicle applications for example. In examples, the motor and/or generator 132 may be an electric motor. In this regard, the motor and/or generator 132 may be an electric motor and an electric generator that converts electrical energy into mechanical power, such as torque, and converts mechanical power into electrical energy. The motor and/or generator 132 may be electrically connected to the battery 134. The motor and/or generator 132 may convert energy from the battery 134 into mechanical power, and may provide energy back to the battery 134, for example, via regenerative braking. The battery 134 may be electrically connected to the motor and/or generator 132 and may provide electrical energy to and/or receive electrical energy from the motor and/or generator 132. The battery 134 may provide electrical energy to the traffic lane identification system.

The transmission 136 may be an automatic transmission (e.g., a 6-speed, 7-speed, 8-speed, 9-speed, or 10-speed automatic transmission) or a manual transmission (e.g., a six-speed manual transmission) having at least one reverse gear, a neutral position, and at least one forward (or drive) gear. In examples, the transmission 136 may be an electric vehicle transmission (e.g., a single speed or two speed transmission). The transmission 136 may receive torque from the motor and/or generator 132 and may transfer the torque to one or more wheels of the vehicle 102.

The traffic lane identification system 100 may further include the network access device 114. The network access device 114 may be electrically connected to the ECU 106 and may include a communication port or channel, such as one or more of a Wi-Fi unit, a Bluetooth® unit, a Radio Frequency Identification (RFID) tag or reader, a DSRC unit, and/or a cellular network unit for accessing a network 140 (e.g., CDMA, GSM, 3G, 4G, 5G, etc.). The network access device 114 may transmit data to and receive data from devices and systems not directly connected to the vehicle 102. For example, the ECU 106 may communicate with the external display 120f (e.g., a mobile device, phone, tablet, laptop, etc.), the one or more cameras 116, the one or more sensors 118, the one or more displays 120, and/or the memory 108 via the network access device 114. In examples, the rear-facing camera 116a may wirelessly communicate with the ECU 106 through the network access device 114. This may reduce or eliminate a need for wires running from the rear-facing camera 116a to the vehicle 102.

The traffic lane identification system 100 may further include the memory 108. The memory 108 may be electrically connected to the ECU 106. In examples, the memory 108 may be communicatively coupled (e.g., via the network 140) to the ECU 106 such that the memory 108 is remote from the ECU 106 and/or the vehicle 102. In other examples, the memory 108 may be electrically connected to the ECU 106 and a remote memory (e.g., a remote database) may be communicatively coupled to the ECU 106, with the remote memory having similar, additional, and/or different functions as the memory 108 (e.g., greater storage capacity, enabling over-the-air updates, etc.). The memory 108 may store instructions to execute on the ECU 106 and may include one or more of a random-access memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. The memory 108 may store vehicle parameters (e.g., vehicle weight, vehicle length, vehicle width, vehicle height, transmission gear information, etc.). The memory 108 may further store one or more traffic lane colors as described herein. The one or more traffic lane colors may be predetermined and set by a manufacturer of the vehicle 102 and/or may be set by the user of the vehicle 102 (e.g., via the user interface 120a).

Figure 2:
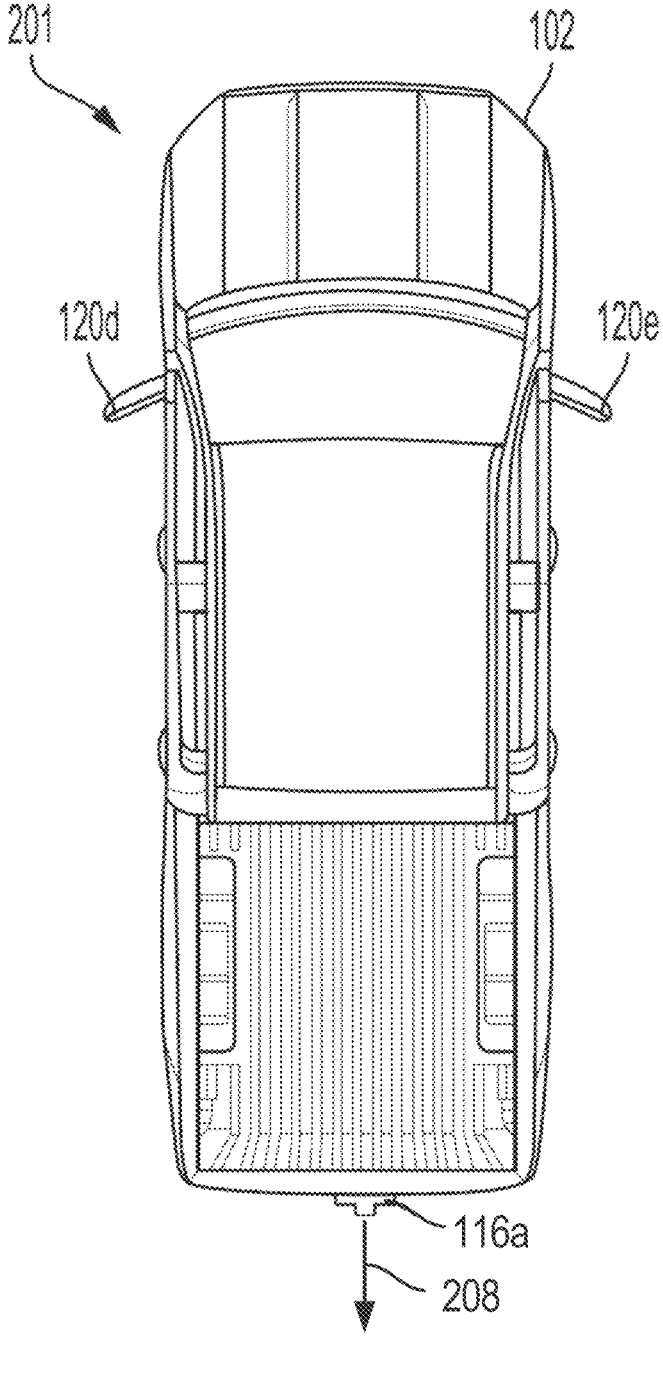
FIG. 2 is a schematic top view of an example vehicle including the example traffic lane identification system of FIG. 1, according to an aspect of the disclosure.

FIG. 2 illustrates an example vehicle 102 including the example traffic lane identification system 100 of FIG. 1. With combined reference to FIG. 1 and FIG. 2, the traffic lane identification system 100 may further include one or more cameras 116. The one or more cameras 116 may be coupled to an exterior 201 of the vehicle 102. In examples, the one or more cameras 116 are coupled to an interior of the vehicle 102 but face outwardly to capture an exterior of the vehicle 102. The one or more cameras 116 can include a rear-facing camera 116a configured to provide a rear view behind the vehicle 102. Although illustrated as being located at the rear center of the vehicle 102, the rear-facing camera 116a can be located at any suitable location of the vehicle 102, such as left side of the vehicle 102, a right side of the vehicle 102, a left mirror 120d of the vehicle 102, a right mirror 120e of the vehicle 102, or any other suitable location depending on the desired design of the vehicle 102. In various aspects, the rear-facing camera 116a can be located at a location that is offset from the center of the vehicle 102. In examples, the one or more cameras 116 can include a side-facing camera, a front-facing camera, or any other suitable camera, depending on the desired direction of view to provide to the user of the vehicle 102.

The one or more cameras 116 may be a digital camera, an infrared thermal camera, and/or a night vision camera (e.g., utilizing active illumination and/or image intensification). In examples, the one or more cameras 116 may be and/or include a panoramic view monitor (PVM) system of the vehicle 102. The one or more cameras 116 may provide, capture, and/or record real-time video (or video data) including images and/or video of a surrounding area of the vehicle 102. The rear-facing camera 116a may provide, capture, and/or record real-time video (or video data) including images and/or video of a rear area of the vehicle 102. Each camera of the one or more cameras 116 may capture one or more fields of view that may include at least a portion of the surrounding area, the vehicle 102. In examples, each camera of the one or more cameras 116 may allow the user to change a zoom level of each camera (e.g., via a user interface 120a) and/or the traffic lane identification system may automatically change the zoom level of each camera based on a speed of the vehicle 102 (e.g., the zoom level decreases as the speed of the vehicle 102 increases). In examples, the one or more cameras 116 can include a trailer camera that can provide a rear view to the user of the vehicle behind the trailer.

The rear-facing camera 116a may be coupled to the exterior 201 and/or a rear of the vehicle 102 (e.g., a rear bumper, a rear tailgate, etc.). In examples, the traffic lane identification system 100 may include a plurality of rear-facing cameras each having a different field of view and/or orientation. The rear-facing camera 116a may provide, capture, and/or record real-time video of a rearward field of view 208 with respect to the vehicle 102 (e.g., capturing a portion of the surrounding area that is to the rear of the vehicle 102). In examples, the rear-facing camera 116a may be a wireless camera such that the rear-facing camera 116a may wirelessly transmit the real-time video of the rearward field of view 208 to the ECU 106. In examples, the rear-facing camera 116a may transmit the real-time video of the rearward field of view 208 to the ECU 106 via a wired connection.

The traffic lane identification system 100 may further include one or more sensors (or one or more vehicle sensors) 118. The one or more sensors 118 may be integrated with the vehicle 102. The one or more sensors 118 may measure, detect (or indicate), and/or determine one or more conditions (or one or more vehicle conditions) of the vehicle 102 periodically and/or continuously. The one or more conditions of the vehicle 102 may include a shift position, a vehicle speed, a turn signal status, a steering angle, a camera condition, and/or a proximity to one or more objects. The one or more sensors 118 may be and/or include software, hardware, firmware, or a combination thereof for measuring, detecting, and/or determining the one or more conditions of the vehicle 102. The one or more sensors 118 may include a transmission sensor (or shift sensor) 118a, a speed sensor 118b, a turn signal sensor 118c, a steering angle sensor 118d, and/or one or more distance sensors 118e. In examples, the traffic lane identification system may include two or more, three or more, four or more, or all of the transmission sensor 118a, the speed sensor 118b, the turn signal sensor 118c, the steering angle sensor 118d, and/or the one or more distance sensors 118e.

The transmission sensor 118a may be located within the vehicle 102 and/or coupled to the transmission 136 of the vehicle 102. The transmission sensor 118a may indicate, detect, and/or determine the shift position (or gear position or mode) of the vehicle 102 and/or the transmission 136. The shift position may include drive, reverse, and/or neutral. In examples, the traffic lane identification system 100 may include a plurality of transmission sensors.

The speed sensor 118b may be located within the vehicle 102. The speed sensor 118b may measure, detect, and/or determine the vehicle speed of the vehicle 102. In examples, the speed sensor 118b may measure, detect, and/or determine the vehicle speed based on a rotation speed of an output shaft of the transmission 136, a rotation speed of the one or more wheels of the vehicle 102, and/or a GPS signal. In examples, the traffic lane identification system 100 may include a plurality of speed sensors 118b.

Figure 3:
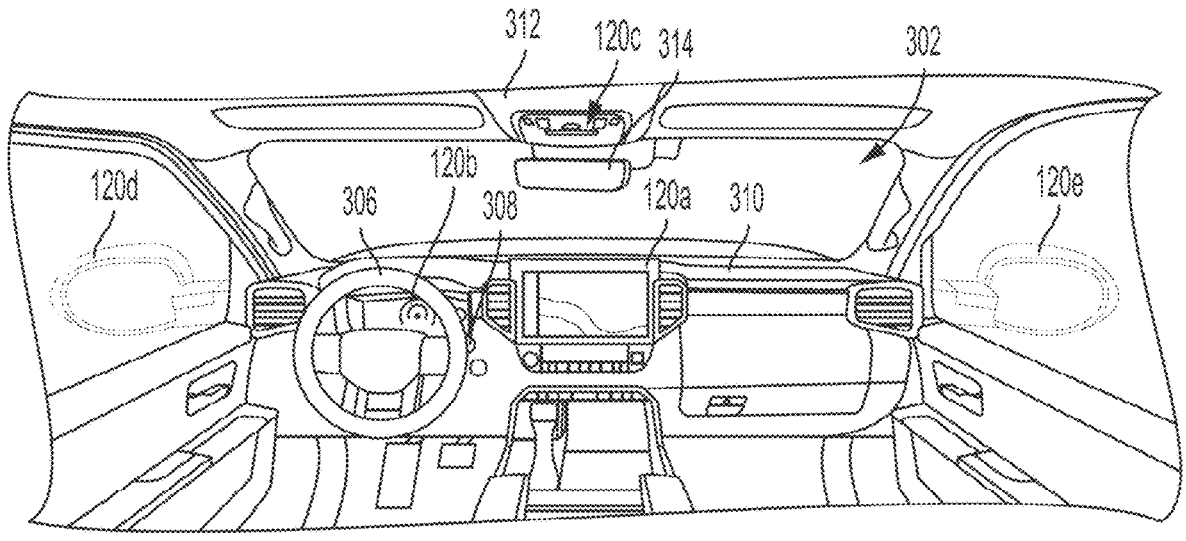
FIG. 3 is an illustration of an example cabin of the vehicle including the example traffic lane identification system of FIG. 1, according to an aspect of the disclosure.

FIG. 3 is an illustration of a cabin 302 of the vehicle 102 including the traffic lane identification system of FIG. 1.

With combined reference to FIG. 1 and FIG. 3, the turn signal sensor 118*c* may be located within the vehicle 102 and/or coupled to an indicator stalk 308 and/or a steering wheel 306 of the vehicle 102. The turn signal sensor 118*c* may indicate, detect, and/or determine the turn signal status of the vehicle 102. The turn signal status may include whether a left turn signal of the vehicle 102 is activated and/or whether a right turn signal of the vehicle 102 is activated. For example, the turn signal sensor 118*c* may detect when a driver of the vehicle 102 activates the left turn signal or the right turn signal of the vehicle 102. In examples, the turn signal sensor 118*c* may detect when the vehicle 102 activates the left turn signal or the right turn signal during, for example, autonomous driving or semiautonomous driving. In examples, the traffic lane identification system 100 may include a plurality of turn signal sensors 118*c*.

The steering angle sensor 118*d* may be located within the vehicle 102 and/or coupled to the steering wheel 306 or of the vehicle 102. The steering angle sensor 118*d* may measure, detect, and/or determine the steering angle of the vehicle 102 (e.g., a degree of rotation of the steering wheel 306 in a left or right direction from a center (or reference) position). In examples, the traffic lane identification system may include a plurality of steering angle sensors. The steering angle sensor 118*d* may indicate whether the vehicle 102 is making a turn (e.g., when the vehicle 102 turns 20 degrees or more left or right) or a minor change in direction (e.g., when the vehicle 102 turns between 0 and 20 degrees left or right).

The one or more distance sensors 118*e* may be coupled to the exterior 201 (see FIG. 2) of the vehicle 102. The one or more distance sensors 118*e* may be and/or include a camera, a sonar sensor, a radar sensor, and/or a lidar sensor. The one or more distance sensors 118*e* may measure, detect, and/or determine the proximity of one or more objects in the surrounding area of the vehicle 102. The one or more distance sensors 118*e* may measure, detect, and/or determine the proximity of the one or more objects by collecting spatial information of the one or more objects and constructing a point cloud. In examples, the traffic lane identification system 100 may include a plurality of distance sensors 118*e*.

With combined reference to FIG. 1, FIG. 2, and FIG. 3, the traffic lane identification system 100 may further include one or more displays (or one or more displays and/or mirrors) 120. The one or more displays 120 may include the user interface (or infotainment display) 120*a*, a gauge cluster 120*b*, a rearview mirror 120*c*, the left mirror 120*d*, and/or the right mirror 120*e*. The one or more displays 120 may be native to the vehicle 102 and/or may be retrofitted to the vehicle 102. The one or more displays 120 may include a liquid crystal display (LCD), a light-emitting diode (LED) display, a segment display, a holographic display, an e-paper display, a laser color video display, and/or other display types. In examples, the one or more displays 120 may include an external display 120*f* (e.g., a mobile phone, a laptop, a tablet, etc.) that may have some or all of the functions (e.g., receiving and displaying images) as the user interface 120*a*, the gauge cluster 120*b*, the rearview mirror 120*c*, the left mirror 120*d*, and/or the right mirror 120*e*. At least one display of the one or more displays 120 may display a lane identifier that identifies the traffic lanes around the vehicle 102 (which is discussed in greater detail below). In examples, the rearview mirror 120*c* displays the lane identifier.

The user interface 120*a* may be located within the cabin 302 of the vehicle 102 and/or may be coupled to a dashboard

310 of the vehicle 102 (as shown by FIG. 3). The user interface 120*a* may provide an interface to the user of the vehicle 102 to interact with and/or receive output from an electronic control unit (ECU) 106. The user interface 120*a* may have a user interface element, such as one or more screens and/or one or more touchscreens with a button, a switch, a microphone, a speaker, a gesture monitoring sensor, a knob, a graphical user interface (GUI), and/or other input/output devices electrically connected to the ECU 106 to provide input and/or output of information (or data) to and/or from the ECU 106. The user interface 120*a* may display the lane identifier, the rearward field of view 208, and/or any other suitable field of view (e.g., a left rearward field of view, a right rearward field of view, a second rearward field of view, a forward field of view, etc.).

The gauge cluster 120*b* may be located within the cabin 302 of the vehicle 102 and/or may be coupled to the dashboard 310 of the vehicle 102 (as shown by FIG. 3). The gauge cluster 120*b* may have one or more screens and/or physical indicators to display vehicle information such as a speedometer, a tachometer, an energy and/or fuel level indicator, a map, etc. In examples, the gauge cluster 120*b* may display the lane identifier, the rearward field of view 208, and/or any other suitable field of view (e.g., a left rearward field of view, a right rearward field of view, a second rearward field of view, a forward field of view, etc.).

The rearview mirror 120*c* may be located within the cabin 302 of the vehicle 102 and/or may be coupled to a ceiling 312 of the vehicle 102 (as shown by FIG. 3). The rearview mirror 120*c* may be an e-mirror. The rearview mirror 120*c* may be an electronic rearview mirror such that a surface 314 of the rearview mirror 120*c* may be or include one or more screens that may display the lane identifier, the rearward field of view 208, and/or any other suitable field of view (e.g., a second rearward field of view, etc.). In examples, the rearview mirror 120*c* may include a traditional (or nonelectronic) rearview mirror such that the surface 314 of the rearview mirror 120*c* may be or include a reflective surface that allows the user to see a reflection of at least a portion of the rearward field of view. In examples, the rearview mirror 120*c* may have an electronic mode (e.g., utilizing the one or more screens of the surface 314) and a traditional mode (e.g., utilizing the reflective surface of the surface 314).

The left mirror (or left side view mirror) 120*d* may be located within the cabin 302 of the vehicle 102 or may be coupled to the exterior 201 of the vehicle 102 (as shown by FIG. 2). The left mirror 120*d* may include an electronic (or digital) left side view mirror having one or more screens that may display the lane identifier and a left rearward field of view. The left mirror 120*d* may include a traditional (or nonelectronic) rearview mirror such that the surface of the left mirror 120*d* may be or include a reflective surface that allows the user to see a reflection of at least a portion of a left rearward field of view. In examples, the left mirror 120*d* may have an electronic mode (e.g., using one or more screens to display the left rearward field of view) and a traditional mode (i.e., using the reflective surface to show a reflection of at least a portion of the left rearward field of view).

The right mirror (or right-side view mirror) 120*e* may be located within the cabin 302 of the vehicle 102 and/or may be coupled to the exterior 201 of the vehicle 102 (as shown by FIG. 2). The right mirror 120*e* may include an electronic (or digital) right side view mirror having one or more screens that may display the lane identifier and a right rearward field of view. The right mirror 120*e* may include a traditional (or nonelectronic) rearview mirror such that the surface of the right mirror 120e may be or include a reflective surface that allows the user to see a reflection of at least a portion of a right rearward field of view. In examples, the right mirror 120e may have an electronic mode (e.g., using one or more screens to display the right rearward field of view) and a traditional mode (i.e., using the reflective surface to show a reflection of at least a portion of the right rearward field of view).

Returning briefly to FIG. 1, the traffic lane identification system 100 may further include one or more processors, such as the electronic control unit (ECU) 106. The ECU 106 may be implemented as a single ECU or in multiple ECUs. The ECU 106 may be electrically connected to some or all of the components of the vehicle 102 and/or the traffic lane identification system (e.g., via a controller area network (CAN) bus and/or other protocols). The ECU 106 may be electrically connected to the one or more cameras 116, the one or more sensors 118, the one or more displays 120, a memory 108, and/or a network access device 114. The ECU 106 may include one or more processors (or controllers) specifically designed for controlling operations of the vehicle 102, such as accelerating, braking, controlling a panoramic view monitor (PVM) of the vehicle 102 (e.g., the one or more cameras 116), etc. In examples, the ECU 106 may be and/or include an advanced driver assistance systems (ADAS) sensor fusion ECU, a panoramic view monitor (PVM) ECU, an engine control module (ECM), a transmission control module (TCM), a telematics control unit (TCU), an in-vehicle infotainment (IVI) ECU, and/or a graphics processing unit (GPU).

With combined reference to FIGS. 1-3, the ECU 106 may receive or determine, via the one or more sensors 118, the one or more conditions of the vehicle 102 including the shift position, the vehicle speed, the turn signal status, the steering angle, the camera condition, and/or the proximity to one or more objects. The ECU 106 may control and/or activate the one or more cameras 116 to capture real-time video data including the rearward field of view 208 or any other desired field of view based on the received or the determined one or more conditions of the vehicle 102.

The ECU 106 may receive the real-time video data from the one or more cameras 116 including the rearward field of view 208. The ECU 106 may transmit the received real-time video data to the one or more displays 120 such that at least one display of the one or more displays 120 may display the rearward field of view 208. For example, the ECU 106 may transmit the received real-time video data including the rearward field of view 208 to the rearview mirror 120c.

Figure 4A:
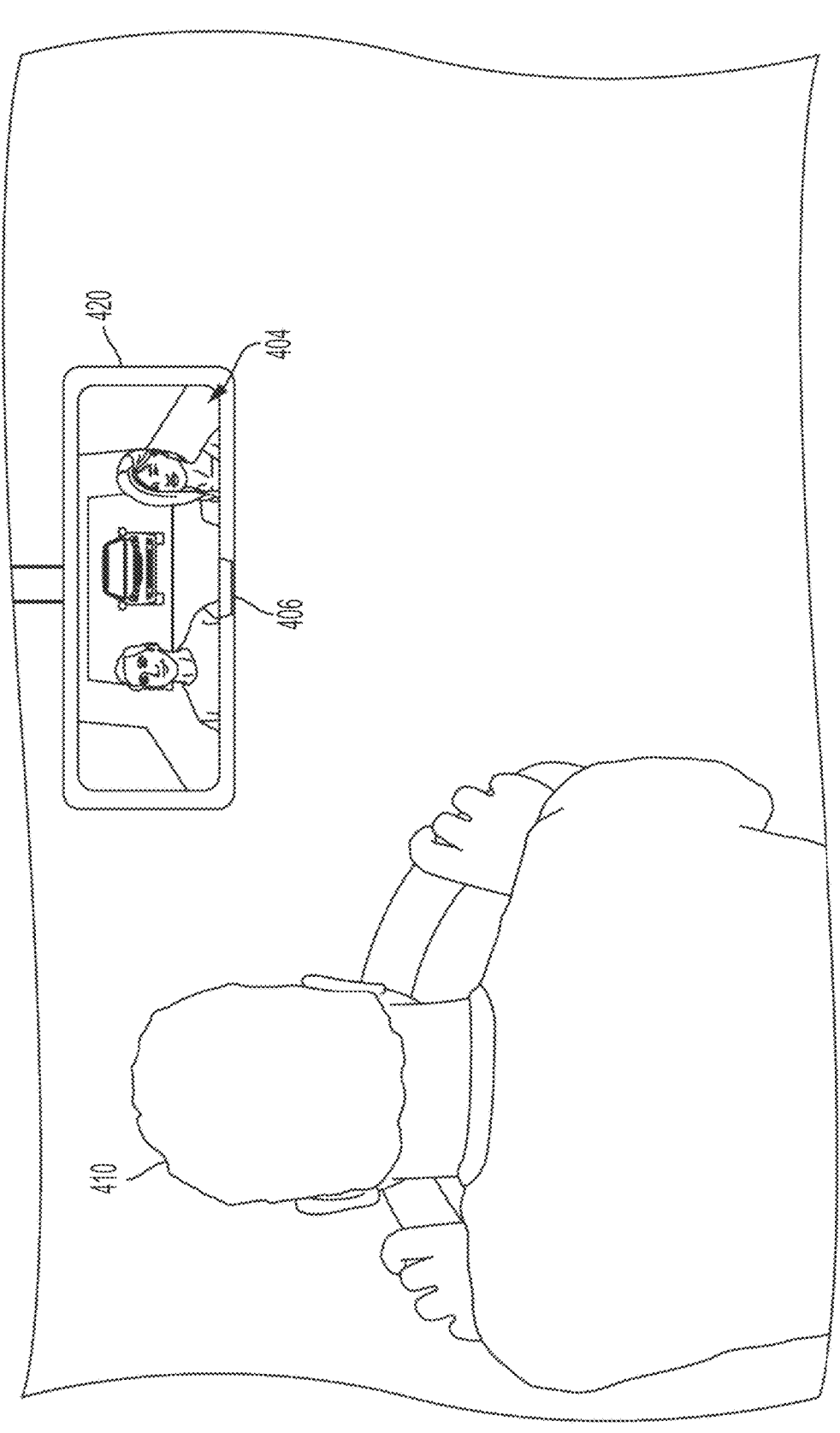
FIG. 4A and FIG. 4B illustrate a driver using an e-mirror, according to various aspects of the disclosure.

FIG. 4A illustrates a driver 410 and a rearview mirror 420 that is an e-mirror. The rearview mirror 420 can be similar to the rearview mirror 120c. The rearview mirror 420 may have a first mode where the rearview mirror 420 reflects light and behaves as a conventional mirror. This first mode is shown in FIG. 4A. The rearview mirror 420 in the first mode shows a reflection 404 of objects behind the driver 410. As shown in FIG. 4A, passengers and a trailing vehicle are shown in the reflection 404 from the rearview mirror 420. The rearview mirror 420 may be switched to a second mode by engaging a button 406.

Figure 4B:
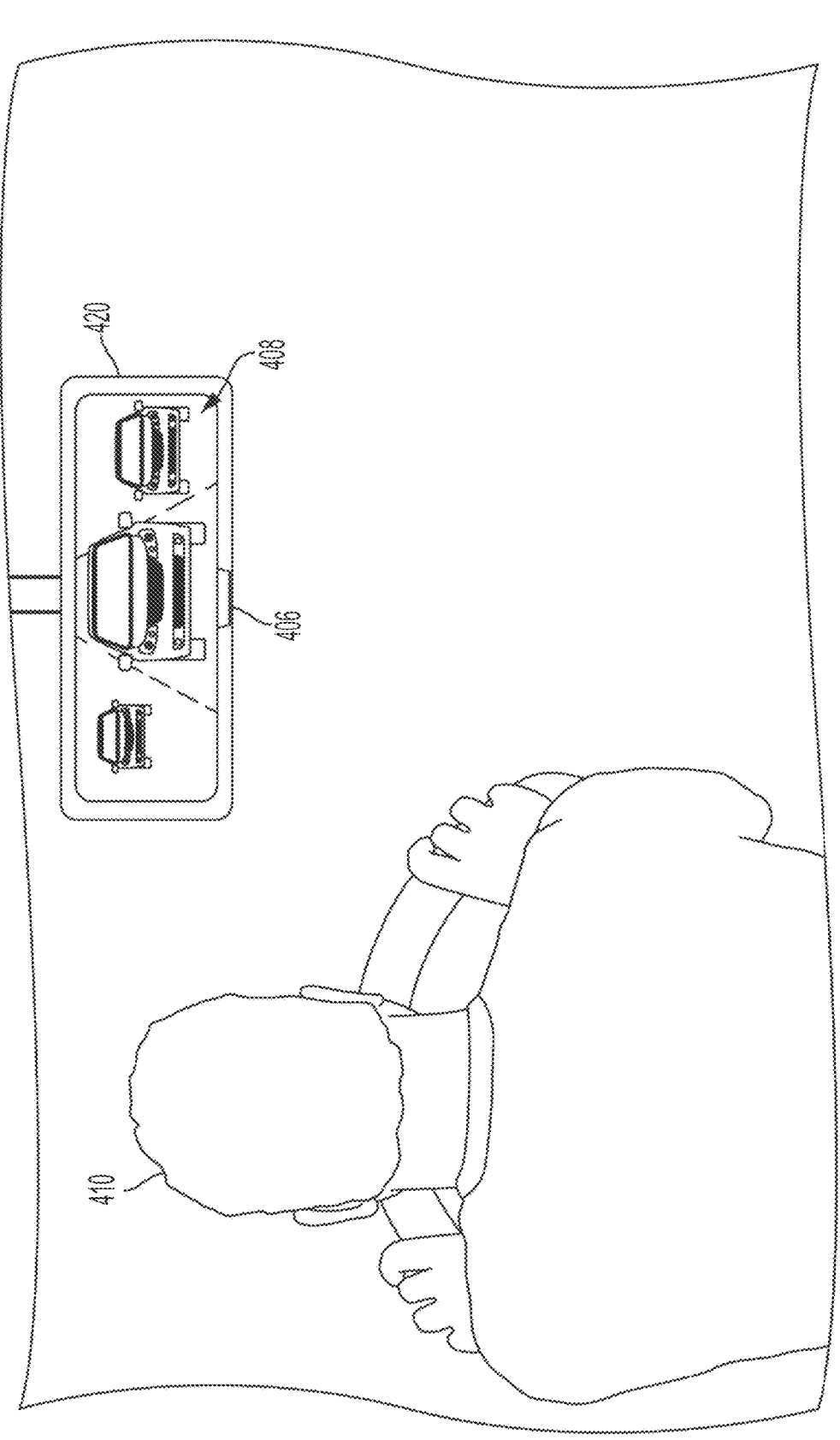

FIG. 4B illustrates the driver 410 and the rearview mirror 420 that is an e-mirror of FIG. 4A. The rearview mirror 420 has a second mode where the rearview mirror 420 displays image data detected by a camera (e.g., the rear-facing camera 116a) facing a rearward direction of the vehicle. The second mode may be activated by engaging the button 406. Further engaging of the button 406 may toggle between the first mode and the second mode. While a button 406 is illustrated in FIG. 4A and FIG. 4B, any other switch or triggering mechanism may be used, such as a touchscreen button, a switch, a microphone for detecting a voice command, or a sensor for detecting a gesture, for example. The rearview mirror 420 may also be automatically switched to the second mode when the rearview mirror 420 (or camera) detects an obstruction or partial obstruction.

When in the second mode, the rearview mirror 420 may display objects behind the vehicle with higher clarity and detail than a conventional mirror or the rearview mirror 420 operating in the first mode. As shown in FIG. 4B, more vehicles are shown in the display 408 as compared to the reflection 404 of FIG. 1A. When the camera used by the rearview mirror 420 is directed in a rearward direction and located behind the rearmost row of seats, objects or occupants within the vehicle may not be seen in the display 408.

Figure 5A:
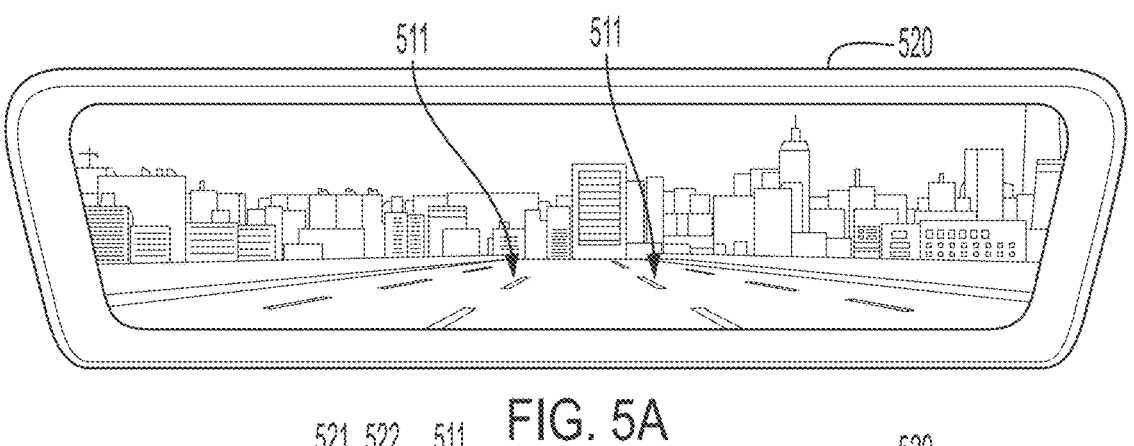
FIG. 5A illustrates an e-mirror displaying a rearward field of view of a vehicle, according to various aspects of the disclosure.

FIG. 5A illustrates a rearview mirror 520 displaying a rearward field of view of a surrounding area of a vehicle. The rearview mirror 520 can be an e-mirror. The rearview mirror 520 can be similar to the rearview mirror 120c of FIG. 1 and FIG. 3, in accordance with various aspects. With combined reference to FIG. 1, FIG. 2, and FIG. 5A, the ECU 106 may transmit real-time video data received from a vehicle camera (e.g., the rear-facing camera 116a) including the rearward field of view 208 to the rearview mirror 520. In this manner, the rearview mirror 520 can display a rearward field of view of a surrounding area of the vehicle. The rearward field of view includes lane markings 511 (e.g., solid lines or dashed lines) that delineate boundaries of one or more traffic lanes. The ECU 106 can generate a lane identifier (e.g., a hash mark, a pattern, and/or a color) indicating a current traffic lane of the vehicle. The ECU 106 can transmit the lane identifier to the display so as to display the lane identifier overlaid within the rearward field of view via the display, for example as illustrated in any of FIG. 5B, FIG. 5C, FIG. 5D, and/or FIG. 5E.

Figure 5B:
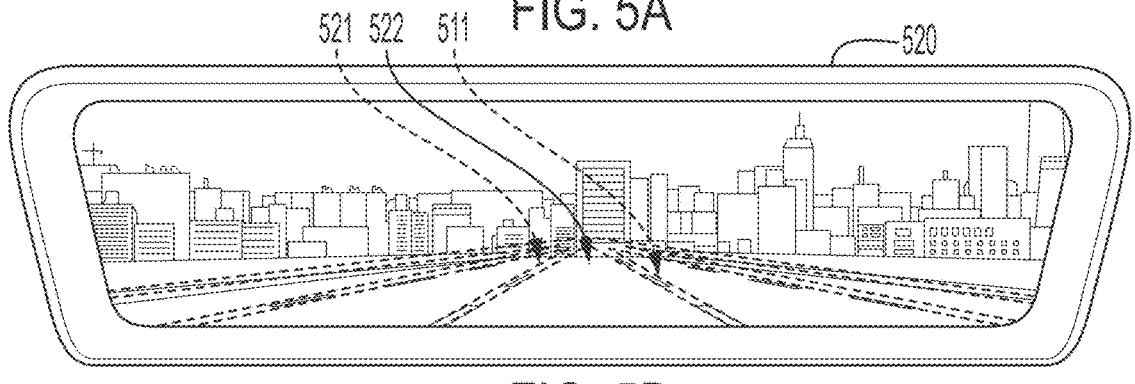
FIGS. 5B-E illustrate the e-mirror of FIG. 5A displaying the rearward field of view of the vehicle with various lane identifiers overlaid thereon, according to various aspects of the disclosure.

FIG. 5B illustrates the rearview mirror 520 displaying a lane identifier 521 overlaying a rearward field of view of a surrounding area of a vehicle. The lane identifier 521 can include one or more digital markers highlighting traffic lane boundaries. In the illustrated embodiment, the lane identifier 521 includes a plurality of digital markers in the form of lines and/or colors highlighting the lane markings 511 in the roadway. The lane identifier 521 can highlight one or more of the lane markings 511 in the roadway to allow the driver to quickly determine the driver's own or current traffic lane 522. In this manner, the lane identifier 521 can include a digital marker highlighting a lane marking 511 of the current traffic lane 522 of the vehicle.

Figure 5C:
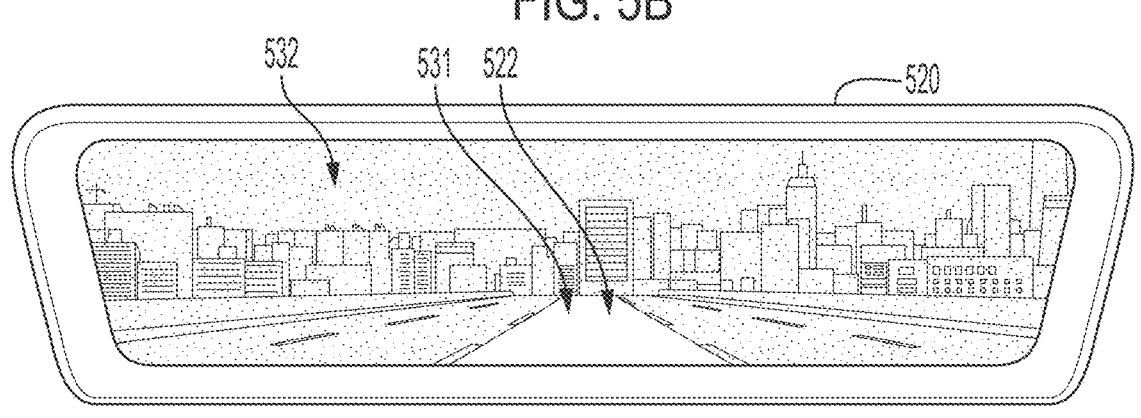

FIG. 5C illustrates the rearview mirror 520 displaying a lane identifier overlaying a rearward field of view of a surrounding area of a vehicle. The lane identifier can include one or more digital markers highlighting traffic lane boundaries. In the illustrated embodiment, the lane identifier includes a first zone 531 including the current traffic lane 522 of the vehicle and a second zone 532. At least one of a pattern, a color and/or a brightness of the second zone 532 is adjusted with respect to the first zone 531. For example, the second zone 532 (which can include the rest of the field of view outside of the first zone 531) can be dimmed, color adjusted (e.g., by biasing the color to a predetermined base color, such as a light blue color for example), among other adjustments. In this manner, the current traffic lane 522 of the vehicle can be highlighted or stand out with respect to the remaining field of view so as to allow the driver to quickly determine the vehicle's own traffic lane apart from adjacent traffic lanes.

In examples, the ECU 106 may dim the second zone 532 with respect to the first zone 531 and/or increase the brightness of the first zone 531 with respect to the second zone 532 such that the driver may quickly and clearly identify the current traffic lane of the vehicle.

Figure 5D:
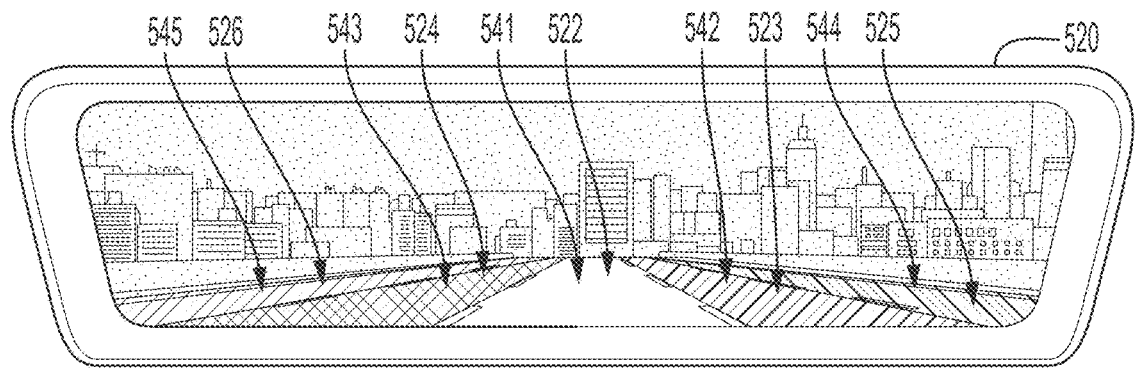

FIG. 5D illustrates the rearview mirror 520 displaying a lane identifier overlaying a rearward field of view of a surrounding area of a vehicle. The lane identifier can include one or more digital markers highlighting traffic lane boundaries. In the illustrated embodiment, the lane identifier includes a plurality of zones, wherein each zone overlays a single traffic lane and is assigned a unique color. For example, a first zone 541 including the current traffic lane 522 of the vehicle can be displayed without a color adjustment. In this manner, the current traffic lane 522 of the vehicle can be displayed as it would normally appear. A second zone 542 including an adjacent traffic lane 523 can be assigned a first color (e.g., yellow or any other suitable color) that overlays the first adjacent traffic lane 523. Stated differently, the first adjacent traffic lane 523 can be highlighted the first color. A third zone 543 including a second adjacent traffic lane 524 can be assigned a second color (e.g., blue or any other suitable color) that overlays the second adjacent traffic lane 524. Stated differently, the second adjacent traffic lane 524 can be highlighted the second color. Any additional traffic lanes detected by the ECU 106 can be assigned respective zones. For example, a fourth zone 544 including a third traffic lane 525 and a fifth zone 545 including a fourth traffic lane 526 can each be assigned a color overlaying the respective traffic lane.

Figure 5E:
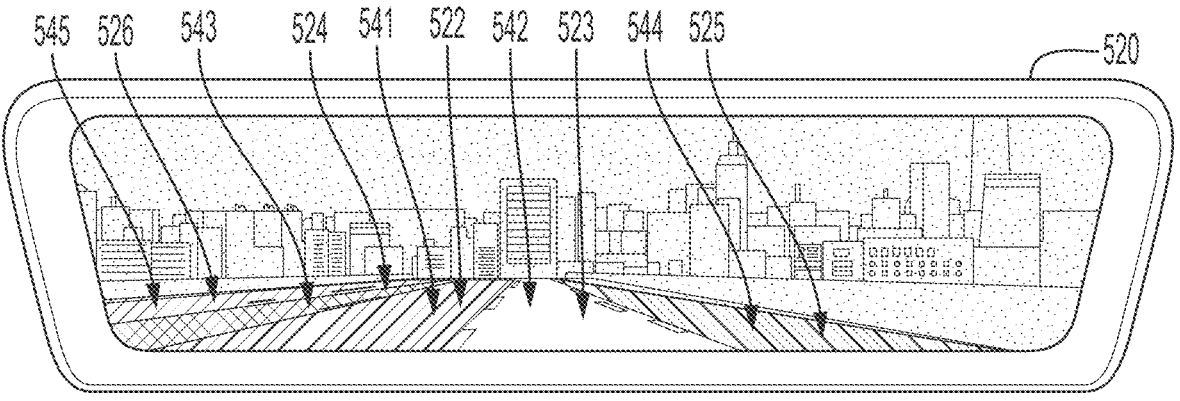

In various aspects, the ECU 106 can assign each traffic lane 522, 523, 524, 525, 526 a color such that the ECU 106 uses the same color to highlight each respective traffic lane 522, 523, 524, 525, 526 regardless of the current traffic lane of the vehicle. For example, with combined reference to FIG. 5D and FIG. 5E, the vehicle can perform a lane change maneuver to move into traffic lane 523. FIG. 5E shows a rearward field of view of the vehicle after the vehicle has moved into traffic lane 523. In response to the ECU 106 detecting that the vehicle has moved into traffic lane 523, the ECU 106 can disable highlighting to the now present traffic lane 523 of the vehicle and activate highlighting to the previous traffic lane 522 of the vehicle. The previous traffic lane 522 (which was previously not highlighted) can be highlighted to a predetermined color, such as orange for example. Should the vehicle move back into traffic lane 522, the ECU 106 can disable highlighting to the traffic lane 522 and reactivate highlighting to traffic lane 523 to highlight traffic lane 523 to the first color, such as yellow for example. Accordingly, the ECU 106 can store traffic lane colors in the memory 108. In this manner, the ECU 106 may generate the one or more lane identifiers by processing lane identifier data that is stored in the memory 108. The ECU 106 may transmit the lane identifier data (or the processed lane identifier data) to a display (e.g., the rearview mirror 520) such that one or more lane identifiers are displayed by the display. By maintaining traffic lane colors, driver confusion can be reduced or eliminated.

In various aspects, the ECU 106 can identify the traffic lanes, the horizon, and any other suitable feature in the real-time video data using feature detection, pattern matching, image detection, estimation using camera packing parameters, machine learning, and/or any other suitable technique. Example feature detection techniques include Harris Corner Detection, Shi-Tomasi Corner Detection, Canny Edge Detection, Blob Detection, and Scale-Invariant Feature Transform (SIFT). The ECU 106 can detect the lane markings 511 in the image data to delineate one or more traffic lanes. In this manner, the ECU 106 can overlay the digital markers within the rearward field of view of the surrounding area of the vehicle at the correct locations and/or zones. The digital markers can be iteratively adjusted and/or updated by the ECU 106 as the vehicle moves along the roadway, changes lanes, and/or changes direction of travel.

In various aspects, the ECU 106 can use GPS data and/or map information (e.g., HD MAP) to help identify lane markings. For example, HD MAP information can provide the number of lanes on the roadway of the vehicle 102.

With combined reference to FIG. 1, FIG. 3, and FIGS. 5A-5E, the ECU 106 can be configured to determine and/or anticipate that the vehicle 102 is making a lane change maneuver. The ECU 106 can be configured to determine and/or anticipate the lane change maneuver using sensor feedback that indicate one or more conditions of the vehicle 102. The one or more conditions may include a current shift position, a current vehicle speed, a current turn signal status, a current steering angle, and/or a current camera status. In examples, the ECU 106 may determine or receive the one or more conditions of the vehicle 102 via the one or more sensors 118.

In various aspects, the ECU 106 determines and/or anticipates the lane change maneuver using the real-time video data received from the rear-facing camera 116a by detecting movement of the lane markers 511 with respect to the vehicle 102. For example, the ECU 106 can detect the vehicle 102 is moving laterally or across the lanes as the lane markers 511 move horizontally across the display. The ECU 106 can similarly determine and/or anticipate the lane change maneuver using real-time video data received from a front camera (e.g., lane departure warning).

In various aspects, the ECU 106 determines and/or anticipates the lane change maneuver by detecting a turn signal of the vehicle 102 is activated. The ECU 106 may receive the turn signal status from the turn signal sensor 118c.

In various aspects, the ECU 106 determines and/or anticipates the lane change maneuver using the steering angle sensor 118d. The ECU 106 can determine and/or anticipate the lane change maneuver in response to the steering angle sensor 118d indicating the steering wheel 306 is at a steering angle that would indicate a lane change.

The ECU 106 can determine and/or anticipate the lane change maneuver using any suitable method(s) and the present disclosure is not intended to be particularly limited in this regard.

Figure 6:
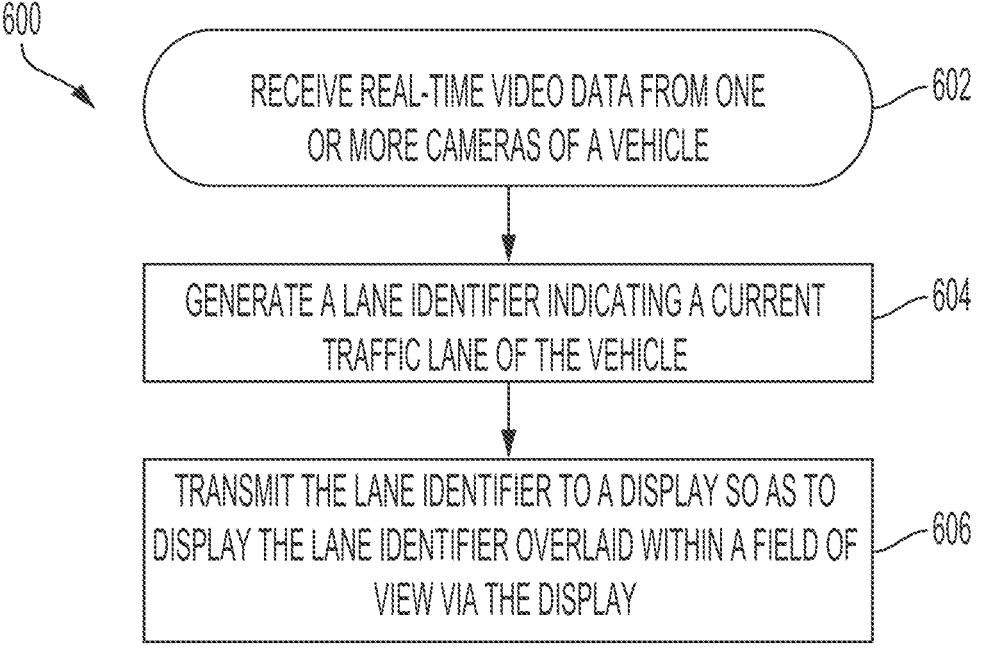
FIG. 6 is a flow diagram of an example process for controlling the lane identification system of FIG. 1, according to an aspect of the disclosure.

FIG. 6 is a flow diagram of an example process 600 for controlling the traffic lane identification system. One or more computers or one or more data processing apparatuses, for example, the ECU 106 of the traffic lane identification system of FIG. 1, appropriately programmed, may implement the process 600. For ease of description, the process 600 is described below with reference to FIGS. 1-5E. The process 600 of the present disclosure, however, is not limited to use of the exemplary lane identification systems of FIGS. 1-5E.

The traffic lane identification system may receive real-time video data from the one or more cameras 116 (602). The real-time video data may include the rearward field of view 208.

The traffic lane identification system may generate a lane identifier indicating a current traffic lane of the vehicle 102 (604). The lane identifier can include a marker highlighting a lane marking of the current traffic lane of the vehicle, for example as described with respect to FIG. 5B. The lane identifier can include a first zone including the current traffic lane of the vehicle and a second zone, wherein at least one of a color or a brightness of the second zone is adjusted with respect to the first zone, for example as described with respect to FIG. 5C. The lane identifier can include a plurality of colors, each color assigned to a respective traffic lane of a plurality of traffic lanes identified in the field of view, for example as described with respect to FIG. 5D and FIG. 5E.

The traffic lane identification system may transmit the lane identifier to a display (e.g., the rearview mirror 120c) so as to display the lane identifier overlaid within the field of view via the display (606). For example, the ECU 106 can transmit the lane identifier to the rearview mirror 120c so as to display the lane identifier overlaid within the field of view as illustrated in the example illustrations of FIGS. 5B-5E, including combinations thereof.

In various aspects, the traffic lane identification system may determine that the vehicle 102 is performing a lane change maneuver. In response to detecting a lane change maneuver, the traffic lane identification system can temporarily disable the lane identifier from the display (e.g., see FIG. 5A) while the vehicle 102 is performing the lane change so as to not confuse a driver of the location of the traffic lanes. In response to detecting the vehicle 102 has completed the lane change maneuver, the traffic lane identification system can generate an updated lane identifier indicating a new current traffic lane of the vehicle. The traffic lane identification system can transmit the updated lane identifier to the rearview mirror 120c so as to display the updated lane identifier overlaid within the real-time field of view via the rearview mirror 120c.

FIG. 7 is a flow diagram of an example process 700 for controlling the traffic lane identification system. One or more computers or one or more data processing apparatuses, for example, the ECU 106 of the traffic lane identification system of FIG. 1, appropriately programmed, may implement the process 700. For ease of description, the process 700 is described below with reference to FIGS. 1-5E. The process 700 of the present disclosure, however, is not limited to use of the exemplary lane identification systems of FIGS. 1-5E. Various aspects of the process 700 can be similar to the process 600 of FIG. 6.

The traffic lane identification system may receive real-time video data from the one or more cameras 116 (602). The real-time video data may include the rearward field of view 208.

The traffic lane identification system may assign a first color to a first (current) traffic lane of the vehicle and may assign a second color to a second (adjacent) traffic lane of the vehicle (703). For example, with momentary combined reference to FIG. 1 and FIG. 5D, the ECU 106 may assign a first color (e.g., orange) to traffic lane 522. The ECU 106 may assign a second color (e.g., yellow) to an adjacent traffic lane 523.

The traffic lane identification system may generate a lane identifier indicating a current traffic lane of the vehicle 102 (704a). The lane identifier can include a plurality of colors, including the second color assigned in step 703, each color assigned to a respective traffic lane of a plurality of traffic lanes identified in the field of view, for example as described with respect to FIG. 5D and FIG. 5E.

The traffic lane identification system may transmit the lane identifier to a display (e.g., the rearview mirror 120c) so as to display the lane identifier overlaid within the field of view via the display (706a). The lane identifier includes highlighting the traffic lane 523 with the second color. The lane identifier may omit highlighting for traffic lane 522.

Stated differently, the first color can be omitted for the current traffic lane 522 of the vehicle 102 (see FIG. 5D).

The traffic lane identification system may determine that the vehicle 102 has moved from the first traffic lane to the second traffic lane (708). For example, the ECU 106 can detect that the vehicle 102 has moved from the traffic lane 522 (see FIG. 5D) to the traffic lane 523 (see FIG. 5E).

The traffic lane identification system may generate an updated lane identifier indicating an updated current traffic lane of the vehicle 102 (704b). Step 704b can be performed in response to the ECU 106 detecting the lane change. The lane identifier can include a plurality of colors, including the first color assigned in step 703, each color assigned to a respective traffic lane of the plurality of traffic lanes identified in the field of view, for example as described with respect to FIG. 5D and FIG. 5E.

The traffic lane identification system may transmit the updated lane identifier to a display (e.g., the rearview mirror 120c) so as to display the updated lane identifier overlaid within the field of view via the display (706b). The updated lane identifier includes highlighting the traffic lane 522 with the first color. The updated lane identifier may omit highlighting for traffic lane 523. Stated differently, the second color can be omitted for the current traffic lane 523 of the vehicle 102 (see FIG. 5E).

Exemplary embodiments of the disclosure have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A traffic lane identification system for assisting a driver of a vehicle, comprising:
   a display located on or within the vehicle; and
   an electronic control unit (ECU) coupled to the display and configured to:
      transmit a real-time video data to the display so as to display a field of view of a surrounding area of the vehicle via the display;
      generate a lane identifier indicating a current traffic lane of the vehicle;
      transmit the lane identifier to the display so as to display the lane identifier overlaid within the field of view via the display;
      determine that the vehicle is performing a lane change maneuver;
      generate an updated lane identifier indicating a new current traffic lane of the vehicle;
      transmit the updated lane identifier to the display so as to display the updated lane identifier overlaid within the field of view via the display; and
      turn off the lane identifier from the display during the lane change maneuver.

2. The traffic lane identification system of claim 1, further comprising a camera coupled to the ECU and configured to capture the real-time video data of the field of view of the surrounding area of the vehicle.

3. The traffic lane identification system of claim 2, wherein the field of view of the surrounding area of the vehicle includes a rearward field of view with respect to the vehicle.

4. The traffic lane identification system of claim 3, wherein the display includes a digital rearview mirror configured to display the rearward field of view and/or the lane identifier.

5. The traffic lane identification system of claim 1, wherein the lane identifier includes a marker highlighting a lane marking of the current traffic lane of the vehicle.

6. The traffic lane identification system of claim 1, wherein the lane identifier includes a first zone including the current traffic lane of the vehicle and a second zone.

7. The traffic lane identification system of claim 6, wherein at least one of a color or a brightness of the second zone is adjusted with respect to the first zone.

8. The traffic lane identification system of claim 1, wherein the lane identifier includes a plurality of colors, each color of the plurality of colors is assigned to a respective traffic lane of a plurality of traffic lanes identified in the field of view.

9. A traffic lane identification system for assisting a driver of a vehicle, comprising:

a camera configured to capture a real-time video data of a field of view of a surrounding area of the vehicle;

a display located on or within the vehicle; and an electronic control unit (ECU) coupled to the display and the camera and configured to:

transmit the real-time video data to the display so as to display the field of view of the surrounding area of the vehicle via the display;

generate a lane identifier indicating a current traffic lane of the vehicle;

transmit the lane identifier to the display so as to display the lane identifier overlaid within the field of view via the display;

determine that the vehicle is performing a lane change maneuver;

turn off the lane identifier from the display during the lane change maneuver;

determine that the vehicle has completed the lane change maneuver;

generate an updated lane identifier indicating a new current traffic lane of the vehicle; and transmit the updated lane identifier to the display so as to display the updated lane identifier overlaid within the field of view via the display.

10. The traffic lane identification system of claim 9, wherein:

the field of view of the surrounding area of the vehicle includes a rearward field of view with respect to the vehicle; and the display includes a digital rearview mirror configured to display the rearward field of view and/or the lane identifier.

11. The traffic lane identification system of claim 9, wherein the lane identifier includes a marker highlighting a lane marking of the current traffic lane of the vehicle.

12. The traffic lane identification system of claim 9, wherein:

the lane identifier includes a first zone including the current traffic lane of the vehicle and a second zone; and at least one of a color or a brightness of the second zone is adjusted with respect to the first zone.

13. The traffic lane identification system of claim 9, wherein the lane identifier includes a plurality of colors, each color of the plurality of colors is assigned to a respective traffic lane of a plurality of traffic lanes identified in the field of view.

14. A method for assisting a driver of a vehicle, comprising:

transmitting, via an electronic control unit (ECU) of the vehicle, a real-time video data to a display so as to display a field of view of a surrounding area of the vehicle via the display;

generating, via the ECU, a lane identifier indicating a current traffic lane of the vehicle;

transmitting, via the ECU, the lane identifier to the display so as to display the lane identifier overlaid within the field of view via the display:

determining, via the ECU, that the vehicle is performing a lane change maneuver;

disabling, via the ECU, the lane identifier from the display during the lane change maneuver;

determining, via the ECU, that the vehicle has completed the lane change maneuver;

generating, via the ECU, an updated lane identifier indicating a new current traffic lane of the vehicle; and transmitting, via the ECU, the updated lane identifier to the display so as to display the updated lane identifier overlaid within the field of view via the display.

15. The method of claim 14, wherein:

the field of view of the surrounding area of the vehicle includes a rearward field of view with respect to the vehicle; and the display includes a digital rearview mirror configured to display the rearward field of view and/or the lane identifier.

16. The method of claim 14, wherein the lane identifier includes at least one of:

a marker highlighting a lane marking of the current traffic lane of the vehicle;

a first zone including the current traffic lane of the vehicle and a second zone, and at least one of a color or a brightness of the second zone is adjusted with respect to the first zone; or a plurality of colors, each color of the plurality of colors is assigned to a respective traffic lane of a plurality of traffic lanes identified in the field of view.

\* \* \* \* \*